Patented Oct. 5, 1954

2,691,019

UNITED STATES PATENT OFFICE 2,691,019 o-HYDROXYARYL DIHALOTRIAZINES

Wendell P. Munro, Martinsville, William B. Hardy, Bound Brook, and Asa W. Joyce, Plainfield, N. J., assignors to American Cyanamid Company, New York, N. Y., a corporation of Maine No Drawing. Application April 10, 1953, Serial No. 348,112

9 Claims. (Cl. 260—248)

This invention relates to the production of 2-hydroxyaryl-4,6-dihalotriazines.

A number of 2 - aryl - 4,6 - dianthraquinonyl-aminotriazines have been prepared and are valuable vat dyes. The best process for preparing these vat dyes is condensation of aminoanthraquinones with 2-aryl-4,6-dihalotriazines, a class of intermediate materials to which the compounds of the present invention belong. Recently an efficient process has been developed for producing some of the 2-aryl-4,6-dihalotriazines, which process involves four steps. In the first step an aroyl chloride is reacted with dicyandiamide to produce an aroyl dicyandiamide. This is hydrolyzed to the corresponding aroyl biuret, ring closed by means of alkali to form a 2-aryl-4,6-dihydroxy-triazine (also known as an aroyl guanamide), which can then be transformed into the corresponding 2-aryl-4,6-dichlorotriazine by means of phosphorus pentachloride. This dichloro compound is condensed with aminoanthraquinones to form the finished dyestuff. These reactions, in the order listed, are described in U. S. Patents 2,407,161, Kaiser and Thurston to American Cyanamid Company; 2,401,599, Adams to American Cyanamid Company; Ostrogovitch, Gazz. Chim. Ital., 62, 229 (1935); and 1,897,428, Hentrich et al., to General Aniline Works. They may be represented by the following formulas:

RCOCl + NH$_2$(C:NH)NHCN $\longrightarrow$

RCONHC(:NH)NHCN $\xrightarrow{\text{(acid)}}$ RCONHCONHCONH$_2$ $\xrightarrow{\text{(alkali)}}$

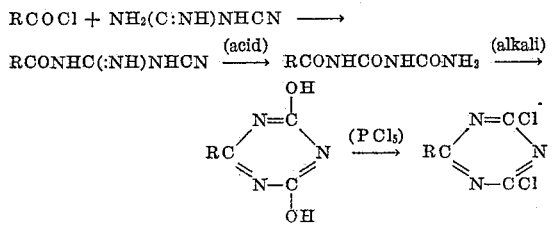

The above reactions, which are quite general, fail in the particular case where R is o-hydroxyaryl. When it is attempted to prepare such compounds, side reactions occur and the triazine ring does not close. It has therefore been impossible in the past to produce 2-o-hydroxyaryl-4,6-dihalotriazines.

According to the present invention, it has been found that the above compounds can be produced by preparing 2-o-alkoxyaryl-4,6-dihalotriazines by the regular methods including the efficient processes described above. These compounds have the following general formula

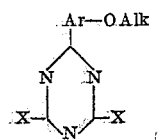

in which Alk is a lower alkyl group, i. e., one having less than 6 carbon atoms, and X is halogen.

The alkoxy group, of course, is in the ortho position with respect to the carbon atom attached to the triazine ring. According to the present invention, it has been found possible to dealkylate the alkoxy compounds by reaction with a hydrogen halide having a molecular weight greater than 20, such as hydrogen chloride, bromide, or iodide.

The splitting off of the alkyl group may be carried out under a wide variety of reaction conditions. It is an advantage of the present invention that the process is in no way critical. In general, it is desirable to effect dealkylation in a reaction medium containing an organic solvent, the hydrogen halide vapors being passed therethrough at elevated temperature with thorough stirring. The organic solvents may be aromatic or aliphatic and are preferably not too volatile so as to eliminate the necessity of expensive pressure equipment. Typical organic solvents are chlorobenzene, the xylenes, o-dichlorobenzene, nitrobenzene, propylene dichloride, tetrahydronaphthalene, 1-chloronaphthalene, tetrachloroethylene, and the like.

The temperature may vary widely although economically useful reaction rates are normally not obtainable materially below 80° C. From 100–200° C. excellent results are obtained although at the higher temperatures the solubility of the hydrogen halide in the organic solvent decreases and temperatures more nearly in the middle of the range are ordinarily preferred in practical operation. 200° C. is about as high a temperature as can be used because excessive temperatures also tend to produce some decomposition of the starting material or final product.

The reaction by which the alkoxy compound is transformed into the hydroxy compound is moderately slow. The length of time, of course, will vary with batch size, stirring efficiency, temperature, and other factors as is normal in batch operations. It is, however, not excessive and even large batches take no more than a few hours. The output of equipment is therefore satisfactorily high.

Isolation of the final product presents no problem as side reactions are substantially absent and the product is obtained in high yield and good purity. This is rather surprising as the triazine ring which is sensitive to acidic reagents appears to be unusually stable in the dealkylation reaction. It is not known why the o-alkoxyaryl compounds show the unique property of smooth dealkylation with hydrogen halides and it is not intended to limit the invention to any theory of this anomalous behavior of the o-alkoxy group.

The alkoxy compounds may be prepared from a large number of o-alkoxyaroyl chlorides. Thus, for example, the chlorides of such acids as o-anisic acid, o-ethoxybenzoic acid, 2-methoxy-3-naphthoic acid, o-propoxybenzoic acid, 4-chloro- 2-methoxybenzoic acid, 5-bromo-2-propoxybenzoic acid, 4-methyl-2-methoxybenzoic acid, 5-nitro-4-methyl-2-methoxybenzoic acid, 1-methoxy-2-naphthoic acid, 4 - nitro - 1 - methoxy - 2 - naphthoic acid, 1-methoxyphenanthrene-2-carboxylic acid (Duvall and Mosettig, J. A. C. S. 60, 2409 (1938)), 3-methoxyphenanthrene-2-carboxylic acid (Gilman and Cook, J. A. C. S. 62, 2813 (1940)), or the like may be employed.

During dealkylation, halogen interchange frequently occurs in the reactive halogens in the triazine ring; for example, if the starting material is 2-(o-methoxyphenyl)-4,6-dichlorotriazine and is treated with hydrogen bromide, it may be found that the product is the 2-(o-hydroxyphenyl)-4,6-dibromotriazine. This is of small practical consequence, since the different dihalotriazines are of comparable reactivity, and may be used interchangeably in subsequent reactions, as indicated below.

The compounds of the present invention are valuable intermediates as the vat dyestuffs obtained by condensing them with various anthraquinonyl amines are materially brighter than compounds in which there is no substitution of hydroxyl in the 2-aryl group. They show a considerable hypsochromic shift, for example, the hydroxy group transforms a reddish-yellow dye into a much cleaner and greener yellow. The dyestuffs produced from the intermediates of the present invention also show improved fastness to light and washing. We do not claim here the dyestuffs obtained by condensing the compounds of the present invention with anthraquinonyl amino compounds, these forming the subject matter of the copending application of Gadea and Munro, Serial No. 227,942 filed May 23, 1951, now abandoned.

The invention will be described in greater detail in the following specific examples, the parts being by weight unless otherwise specified. As some of the intermediate compounds are new, examples of their preparation are included, as well as examples for the production of the aryl dichlorotriazines, and some finished dyestuffs derivable therefrom.

EXAMPLE 1

*o-Methoxybenzoyldicyandiamide*

A slurry of 120 parts of acetone and 21 parts of dicyandiamide is cooled to 5–10° C. and treated with 26.4 parts of potassium hydroxide. After stirring at 0–5° C. until the reaction is substantially complete, the mixture is cooled below 0° C. and there is slowly added to it a solution of 34.1 parts o-methoxybenzoyl chloride in 120 parts of acetone. Stirring is then continued until the reaction mixture comes to room temperature. It is diluted to approximately the volume of 1000 parts of water, and slowly acidified with approximately 14 parts of acetic acid. The resulting product is stirred thoroughly, filtered, washed, and air dried. It melts approximately at 186° C.

EXAMPLE 2

*o-Methoxybenzoylbiuret*

A mixture of 80 parts of o-methoxybenzoyldicyandiamide, prepared as described in Example 1, 400 parts of water, and 67 parts of a concentrated hydrochloric acid is gradually heated to reflux with stirring, and refluxed until biuret formation is complete. The slurry is then cooled to 0–5° C. and filtered. The product is washed with very dilute hydrochloric acid and air dried. It melts approximately at 194–196° C.

EXAMPLE 3

*o-Methoxybenzoguanamide*

54.3 parts of o-methoxybenzoylbiuret, prepared as in Example 2, is dissolved in a solution of 30.2 parts potassium hydroxide in 600 parts of water, and stirred at room temperature until ring closure has been effected, the reaction being slower than in the two preceding examples. The product is precipitated by careful acidification with approximately 21 parts of acetic acid, and then cooled and filtered. It melts approximately at 250° C.

EXAMPLE 4

*2-o-methoxyphenyl dichlorotriazine*

A mixture of 10 parts of o-methoxybenzoguanamide, prepared as in Example 3, 21 parts phosphorus pentachloride, and 46 parts phosphorus oxychloride, is refluxed until chlorination is complete. The product is then drowned rapidly in about 800 parts of a mixture of ice and water, stirred vigorously, filtered, washed and dried. It may be purified by dissolving in benzene, filtering, and evaporating to dryness. It melts approximately at 136° C.

EXAMPLE 5

*2-(1-hydroxyphenyl)-4,6-dichlorotriazine*

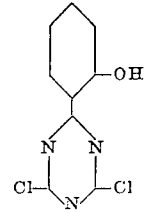

A mixture of 18.9 parts of o-methoxyphenyl dichlorotriazine and 160 parts of o-dichlorobenzene is heated to 150° C. and treated with a stream of anhydrous hydrogen bromide until dealkylation is complete. The hydrogen bromide is then replaced by a stream of anhydrous hydrogen chloride at the same temperature until replacement of bromine by chlorine is complete. The solvent is removed by distillation in vacuo and the crude product recrystallized from methylcyclohexane. It melts at approximately 155° C.

EXAMPLE 6

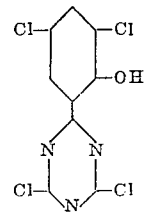

120 parts of 2-(2'-hydroxyphenyl)-4,6-dichloro-1,3,5-triazine is dissolved in 4,000 parts of carbon tetrachloride. Five parts of iron powder is added and at 30° a slow stream of chlorine is passed through the mass. After several hours, the temperature is raised to 50° and the introduction of chlorine is continued at this temperature until two chlorine atoms have been introduced. The solvent is removed by distillation and the crude chlorinated product is recrystallized from 1,900 parts of methylcyclohexane. Pale yellow needle-like crystals were obtained.

If instead of chlorine an excess of bromine is added in the above experiment, the corresponding 2-(3',5'-dibromo-2'-hydroxyphenyl)-4,6-dichloro-1,3,5-triazine can be prepared.

EXAMPLE 7

*2-(o-hydroxyphenyl)-4,6-dibromotriazine*

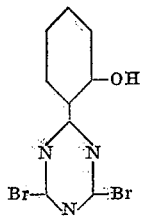

A solution of 12.5 parts of o-methoxyphenyl dichlorotriazine in 65 parts of o-dichlorobenzene is heated to 150° C. and treated at this temperature with a stream of dry hydrogen bromide gas until demethylation is complete. The mixture is then cooled and filtered, the product being washed with hexahydrotoluene. An excellent yield is obtained. If desired, the product can be purified by recrystallization from carbon tetrachloride or benzene.

EXAMPLE 8

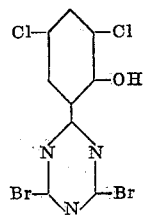

5.9 parts of 2-(o-hydroxyphenyl)-4,6-dibromo-1,3,5-triazine is dissolved in 45 parts of dichlorobenzene and 0.05 part of iodine is added. The mass is stirred at 25 to 30° C. while 6.8 parts of sulfuryl chloride is added gradually. The mixture is then warmed slowly to 50° C. and then cooled to 25° C. while stirring. After a further cooling to 15° C., the reaction product is filtered and recrystallized from a mixture of toluene and methylcyclohexane.

EXAMPLE 9

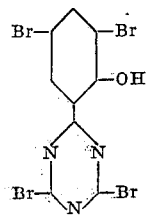

The procedure of Example 8 is followed, substituting 8.1 parts of bromine for the sulfuryl chloride. The tetrabromohydroxyphenyl triazine is a yellow solid.

EXAMPLE 10

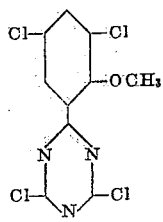

25.6 parts of 2-(o-methoxyphenyl)-4,6-dichloro-1,3,5-triazine is introduced into 130 parts of dichlorobenzene and 0.4 part of iodine are added. 42 parts of sulfuryl chloride is gradually added at room temperature. The mass is heated to 85° C. and stirred at this temperature until two chlorine atoms have been introduced. After removing excess sulfuryl chloride under reduced pressure, the reaction mixture is cooled to 5–10°. The precipitated crystals are removed by filtration and washed with methylcyclohexane. After recrystallization from methylcyclohexane, pale yellow needle-like crystals of the dichloromethoxyphenyldichloro triazine are obtained in excellent yield.

EXAMPLE 11

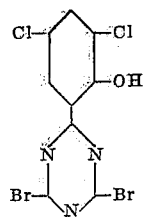

7.5 parts of 2-(3,5-dichloro-2'-methoxyphenyl)-4,6-dichloro-1,3,5-triazine are introduced into 39 parts of dichloro-benzene and the mass is heated to 150° C. Anhydrous hydrogen bromide is passed through the solution for some time. The mass is cooled to 15° C. and the reaction product is separated by filtration, washed and dried. In it can be found 2-(3',5'-dichloro-2'-hydroxyphenyl)-4,6-dibromo-1,3,5-triazine.

EXAMPLE 12

*2-methoxy-5-chlorobenzoyldicyandiamide*

28 parts of 2-methoxy-5-chlorobenzoic acid is converted to acid chloride in the ordinary way by treatment with thionyl chloride, the reaction being completed by gradual heating followed by removal of excess thionyl chloride under reduced pressure. The resulting product is dissolved in 40 parts of acetone.

A mixture of 23.4 parts of dicyandiamide, 136 parts of acetone and 1.5 parts of water is cooled to 0° C., treated with 19.6 parts (pure basis) of flake potassium hydroxide, stirred thoroughly at approximately 0° C., and slowly treated with the above prepared acetone solution of 2-methoxy-5-chlorobenzoyl chloride. The resulting slurry is drowned in ice water and made weakly acidic with dilute sulfuric acid. The product is then filtered and washed free of acid. A good yield is obtained. It melts at approximately 220° C. with decomposition.

EXAMPLE 13

*2-methoxy-5-chlorobenzoylbiuret*

A solution of 3 parts of 99% sulfuric acid in 70 parts of water is added to 5.0 parts of the above prepared 2-methoxy-5-chlorobenzoyldicyandiamide, which is first wetted with 12 parts of ethanol. The mixture is then refluxed until the reaction is complete, the alcohol being allowed to distill out. The product is cooled, filtered, and dried at 60° C. A good yield is obtained of product melting approximately 198° C. with decomposition.

EXAMPLE 14

*2-methoxy-5-chlorobenzoguanamide*

A mixture of 4.4 parts of the above prepared 2-methoxy-5-chlorobenzoylbiuret, 2.5 parts of sodium hydroxide, and 50 parts of water is stirred until ring closure takes place and allowed to stand overnight. The solution is filtered and weakly acidified with 20° Bé. hydrochloric acid.

The resulting slurry is cooled in an ice water bath and filtered. A good yield is obtained. The product melts approximately at 250° C. with decomposition.

EXAMPLE 15

*2-methoxy-5-chlorophenyl dichlorotriazine*

A mixture of 3.3 parts of the above prepared 2-methoxy-5-chlorobenzoguanamide, 6.3 parts of phosphorus pentachloride, and 17 parts of phosphorus oxychloride is refluxed until chlorination is completed, drowned in about 250 parts of ice and water, and stirred for 1 hour. The product is filtered, washed, and dried at 60° C. If desired, it can be purified by extraction with benzene followed by evaporation. It melts at approximately 156° C.

EXAMPLE 16

*2-hydroxy-5-chlorophenyl dibromotriazine*

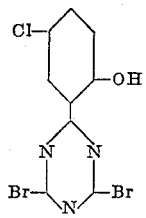

A mixture of 2.8 parts of the above prepared 2-methoxy-5-chlorophenyl dichlorotriazine and 29 parts of o-dichlorobenzene is stirred, heated to about 140° C., and treated with a stream of hydrogen bromide gas until demethylation is complete, while the initially clear light yellow solution steadily darkens in color. The mixture is thoroughly cooled and filtered, the product being washed with methylcyclohexane and dried at 50 to 60° C.

We claim:

1. The new 2-o-hydroxyaryl-4,6-dihalotriazine compounds having the formula

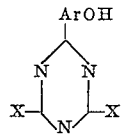

in which Ar is an o-phenylene radical and X is selected from the group consisting of chlorine and bromine.

2. A compound of the formula

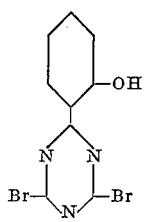

3. A compound of the formula

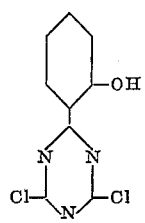

4. A compound of the formula

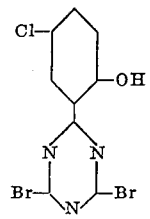

5. A compound of the formula

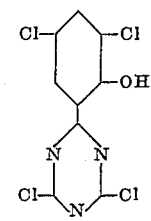

6. A compound of the formula

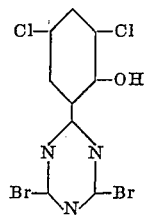

7. A compound of the formula

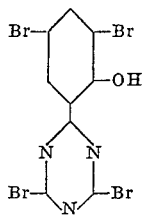

8. A compound of the formula

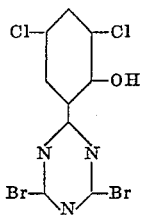

9. A process of preparing a compound according to claim 1 by deealkylating a 2-o-alkoxyaryl-4,6-dihalotriazine compound of the formula

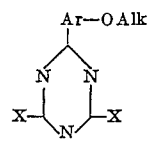

in which Alk represents a lower alkyl radical, Ar represents an o-phenylene radical, and X represents halogen, by treatment with a hydrogen halide in an inert organic solvent at a temperature between 100° C. and 200° C.

No references cited.